United States Patent [19]

Sharon

[11] Patent Number: 4,635,503

[45] Date of Patent: Jan. 13, 1987

[54] BICYCLE SPROCKET DRIVE ASSEMBLY

[75] Inventor: Wilfred J. Sharon, Clarksville, Tenn.

[73] Assignee: Thun, Inc., Clarksville, Tenn.

[21] Appl. No.: 721,607

[22] Filed: Apr. 10, 1985

[51] Int. Cl.⁴ .............................................. G05G 1/12
[52] U.S. Cl. .................................. 74/594.2; 403/359
[58] Field of Search ...................... 74/594.2; 29/159.2;
403/359, 380

[56] References Cited

U.S. PATENT DOCUMENTS

| | | | |
|---|---|---|---|
| 596,523 | 1/1898 | Midgley | 74/594.2 |
| 596,846 | 1/1898 | Brown | 74/594.2 |
| 3,868,863 | 3/1975 | Gasner | 474/158 |

Primary Examiner—Larry I. Schwartz
Attorney, Agent, or Firm—Jeffrey S. Mednick; William G. Miller, Jr.

[57] ABSTRACT

A bicycle sprocket drive which utilizes a crank having a number of splines and a sprocket having mating indentations or slots in its face. The splines and the mating radial slots have tapered driving faces. By forming the tapered slots into the front face of the sprocket, as by a stamping process, the removal of material from the sprocket is avoided. The resulting back faces of the sprocket slots, because they are displaced from the remainder of the sprocket, serve to provide the desired alignment of the drive sprocket with the rear or driven sprocket of the bicycle.

5 Claims, 4 Drawing Figures

BICYCLE SPROCKET DRIVE ASSEMBLY

BACKGROUND OF THE INVENTION

This invention relates to a bicycle sprocket drive assembly such as is typically used in a chain driven bicycle. The assembly consists of: right and left crank arms, on which the pedals mount; a crank shaft connecting the crank arms (or the unitary combination of those elements in a one-piece structure); and the front or drive sprocket of the bicycle. This front sprocket is engaged by the crank arm-crank shaft combination so that it is driven by the force applied to the pedals.

More particularly, this invention relates to a structure that provides the driving engagement between the crank arm-crank shaft combination, hereinafter referred to as the crank, and the front or drive sprocket.

The structures used previously to drive front sprockets from a crank included sprocket engaging shapes associated with the crank which were polygonal, splined, or some other non-rotatable shape. The sprockets received those shapes in cut-through axial mating apertures or in mating shapes machined or cast into the sprocket face or hub.

Those prior art structures using cut-through aperatures all suffer from the possibility of early failure of the drive by failure of the material around the central hole of the sprocket. For example, it has been found that the splines on sprocket assemblies which use the mating spline arrangement tend to tear away from the sprocket after long use when high driving forces are applied to the pedals. Such failures are in the nature of fatigue failures at the high stress regions of the sprocket's spline structure. The prior art structures which use machined or cast shapes have the disadvantage of being expensive to manufacture in that more metal is required for the sprocket along with more expensive machining or casting procedures.

In addition to problems with material failures and the more expensive manufacturing processes required in the prior art arrangements, they have generally required that the parts have closer tolerances and that they be more carefully aligned during assembly than is desired for ease and economy of manufacture.

It is an object of this invention to provide a sprocket driving arrangement which will be more durable than the prior art arrangements by being less subject to fatigue failure while requiring less metal in the parts.

It is another object of this invention to provide a sprocket driving arrangement which will provide increased ease and economy of manufacture along with greater durability.

SUMMARY OF THE INVENTION

The objects of this invention have been achieved by combining a crank having a number of radial tapered splines with a sprocket having mating indentations or slots formed into its face. By forming the tapered slots into the front face of the sprocket, as by a stamping process, the removal of material from the sprocket is avoided, and the back face of the sprocket slots, because they are displaced from the remainder of the sprocket, serve to provide the desired alignment of the drive sprocket with the rear or driven sprocket of the bicycle by determining the spacing between the main part of the sprocket and the abutting bearing cone.

BRIEF DESCRIPTION OF THE DRAWINGS

The present invention is shown in the following figures, in which like reference characters refer to like parts.

DESCRIPTION OF THE PREFERRED EMBODIMENT

Figure 1:
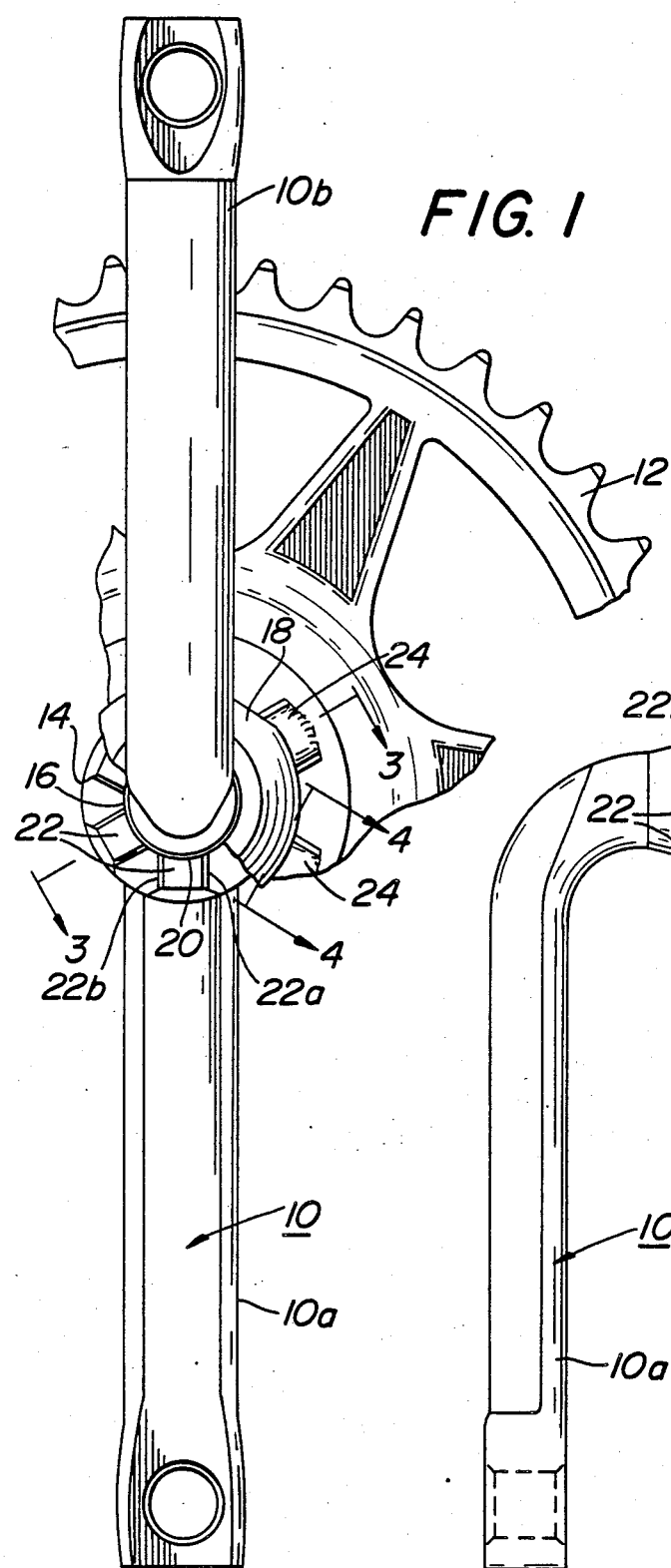
FIG. 1 is a front elevation of a unitary crank arm and shaft assembled in driving engagement to a sprocket by means of a threaded bearing cone (partially broken away) using the novel coupling of the present invention.

In FIG. 1 a unitary or one-piece crank 10 is shown as having crank arms 10a and 10b connected by crank shaft 10c (FIG. 2) and arranged to be in driving engagement with a sprocket 12. The crank has a flange 14, which serves to retain the sprocket, when the sprocket is appropriately mounted so that its front face is in abutting relationship with the flange and the center hole of the sprocket is mounted on the collar 16. This relationship between the crank and sprocket is maintained by tightening the nut 18, which is shaped to act as a bearing cone, on threaded journal 20 so that the nut is pressing the sprocket toward the flange 14.

The driving engagement of the crank with the sprocket, shown in FIG. 1, is provided by the engagement of the radial splines or teeth 22 of the crank with slots 24 in the sprocket. The crank splines are shown as being tapered along their side faces 22a and 22b, that is, along the faces which are essentially the radial faces or driving faces of the splines. These crank splines are designed to extend to the maximum radius of the crank shaft and to intimately engage the matching depressions or slots 24, which can typically be formed as by pressing or stamping into the front face of the sprocket. This forming process may be either hot, cold or warm forming, however cold forming has been found to be preferable. In FIG. 1, the back faces of the slots 24 are all that can be seen. These back faces are parallel to the remainder of the sprocket but displaced by the pressing or stamping operation which forms the slots.

In assembly of the crank and sprocket the back faces of the slots are abutted by the bearing cone 18 which is threaded on the journal 20 and tightened against the sprocket to maintain the sprocket in driving engagement with the crank. Thus, the back faces of the slots serve to determine the spacing between the bearing cone and the main part of the sprocket and thereby determines the alignment between the drive sprocket and the driven sprocket normally mounted on the rear wheel of a bicycle. Good alignment of the sprockets is, of course, necessary for smooth chain operation and is normally provided by a separate spacing washer positioned between the sprocket and the bearing cone during assembly. With the present invention, the spacing washer can be omitted, thus simplifying the assembly operation.

Figure 2:
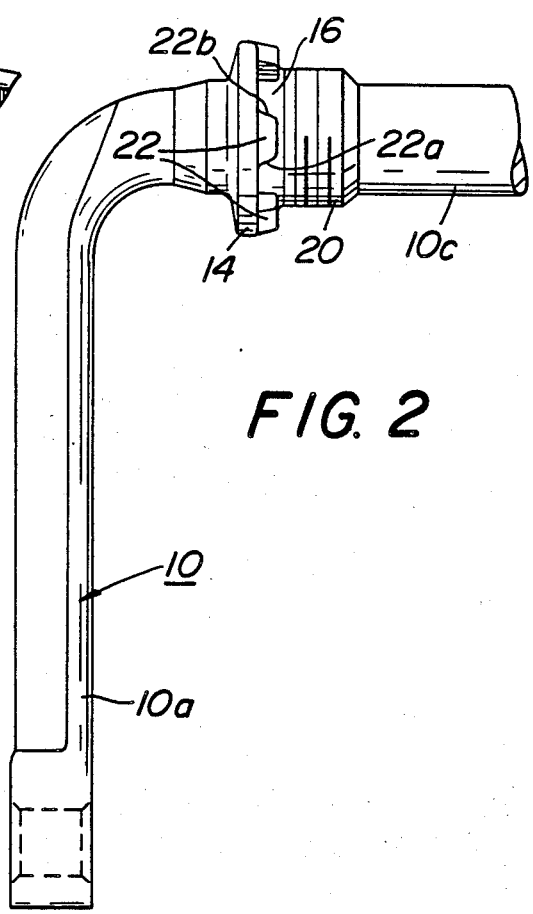
FIG. 2 is a partial side elevation showing half of the unitary crank arm and shaft combination showing the tapered splines which engage the sprocket.

FIG. 2, which is a side elevation of the crank alone, shows more clearly the shape of the splines 22 and their tapered faces 22a and 22b as well as the manner in which the splines project from the flange 14 and join the collar 16.

Figure 3:
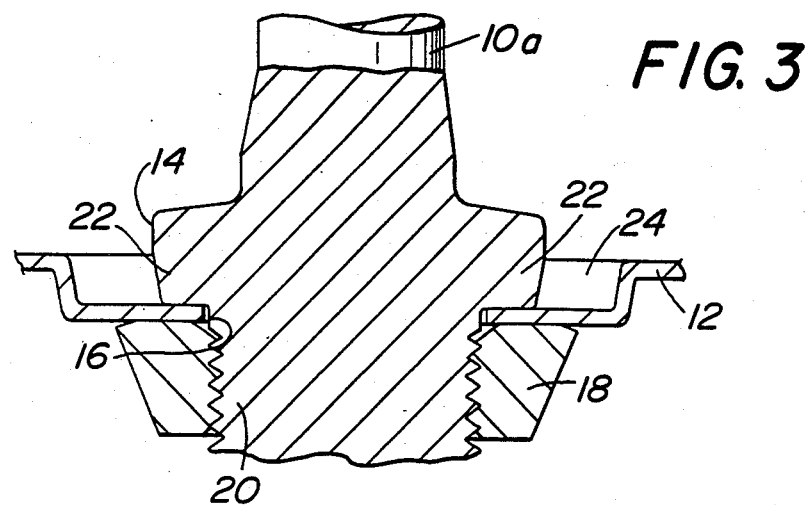
FIG. 3 is a cross-section taken on lines 3—3 of FIG. 1 to illustrate the shape of the splines along their long dimension.
Figure 4:
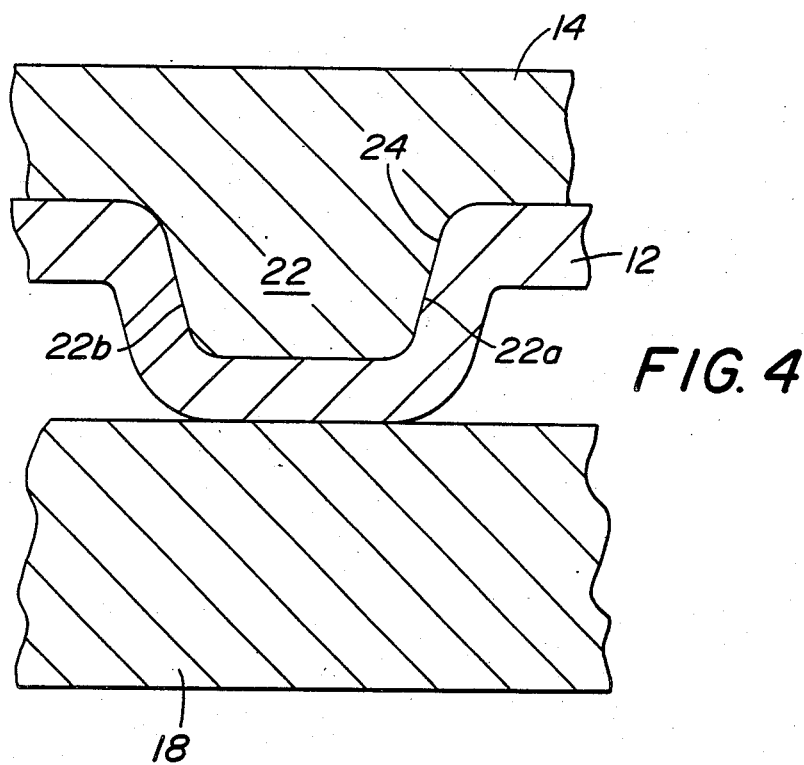
FIG. 4 is a cross-section taken on lines 4—4 of FIG. 1 to illustrate in detail the shape of a single spline and its mating slot. This view is taken at ninety degrees to the view of FIG. 3.

In FIG. 3 further details of the shape of the slots along their long dimension is provided to illustrate the tapered sides of the slots which are engaged by the matching tapered sides of the splines. Preferably the dimensions of the splines and the slots are such that the splines are a tight fit in the slots when the abutting bearing cone is tightened against the sprocket so that there will be no play between the crank and the sprocket. The taper of the drive faces 22a and 22b of the splines, and the taper of the comparable faces of the slots which shows best in FIG. 4 are preferably in the range between 2 and 15 degrees. The taper is kept small to minimize any tendency for a caming action between the splines and the slots. As will be evident to those skilled in the art, the dimensions of the splines and slots may be such that the splines do not bottom in the slots when nut 18 is tightened. A tight fit can then be assured, however, it is necessary to make sure that the tightening of the nut will not cause an "oil-canning" of the sprocket.

It will be evident from the above description that the present invention provides a crank-sprocket assembly which is less subject to fatigue failure or other stress related failures of the sprocket, as well as being easier to assemble during manufacture. The reduction in material failures accomplished with the present invention is believed to be related to the shapes used in the non-rotatable coupling between the crank and sprocket which, in the present invention, is designed to avoid sharp corners on the sprocket material, thus avoiding stress risers. More importantly, the manner in which those non-rotatable shapes are produced does not require the removal of material from the central region around the mounting hole of the sprocket, as is required in all of the prior art arrangements where the drive is through the central region of the sprocket or where the mating shapes are cut, as by a chip producing process, into the sprocket. It has been found that with the present invention, as compared with the use of splines mating with cut-through teeth in the sprocket, that it is possible to reduce the thickness of the sprocket from ⅛" to 0.078" (using 1010 steel) while at the same time more than tripling the life of the drive system before fatigue failure is encountered.

The added ease of assembly which results from the present invention is not only the result of the omission of the spacing washer which has been referred to, but also because of the ease with which the sprocket may be mated with the crank as a result of the taper in the splines and the slots, which makes the alignment of the two parts during assembly less critical.

What is claimed is:

1. A bicycle sprocket drive assembly, comprising:
   a crank having crank arms connected by a crank shaft, a collar on said shaft positioned at an end of said shaft to receive the central aperture of a sprocket and a sprocket retaining flange positioned at the outboard end of said collar, said flange having sprocket-engaging splines on its inboard surface extending radially from said collar and being shaped so that they are tapered along their drive faces;
   a metal drive sprocket having a central aperture for mounting on said collar and having spline receiving slots formed into its surface by cold working said metal, said slots having tapers matching those of said splines and engaging the full radial extent of said splines; and
   means for maintaining said splines in engagement with said slots during the operation of said crank.

2. A bicycle sprocket drive assembly as set forth in claim 1 in which said means for maintaining engagement of said splines with said slots includes:
   a nut threadably engaging said crank upon tightening so that said sprocket is pressed against said flange.

3. A bicycle sprocket drive assembly as set forth in claim 2 in which:
   said nut is shaped to function as a bearing cone.

4. A bicycle sprocket drive assembly as set forth in claim 1 in which:
   the taper of the drive faces of the splines and of the mating faces of the sprocket slots is in the range of 2-15 degrees.

5. A bicycle sprocket drive assembly, comprising:
   a crank having sprocket-engaging splines tapered along their drive faces;
   a drive sprocket having spline receiving slots formed into its surface, said slots having tapers matching those of said splines stamped into said drive sprocket to such a depth that the back faces of the sprocket slots are displaced from the remainder of the sprocket by an amount required for the desired spacing between the sprocket and the abutting nut to thereby determine the alignment of the drive sprocket of the bicycle with respect to other parts; and
   means for maintaining said splines in engagement with said slots during the operation of said crank.

* * * * *